UNITED STATES PATENT OFFICE.

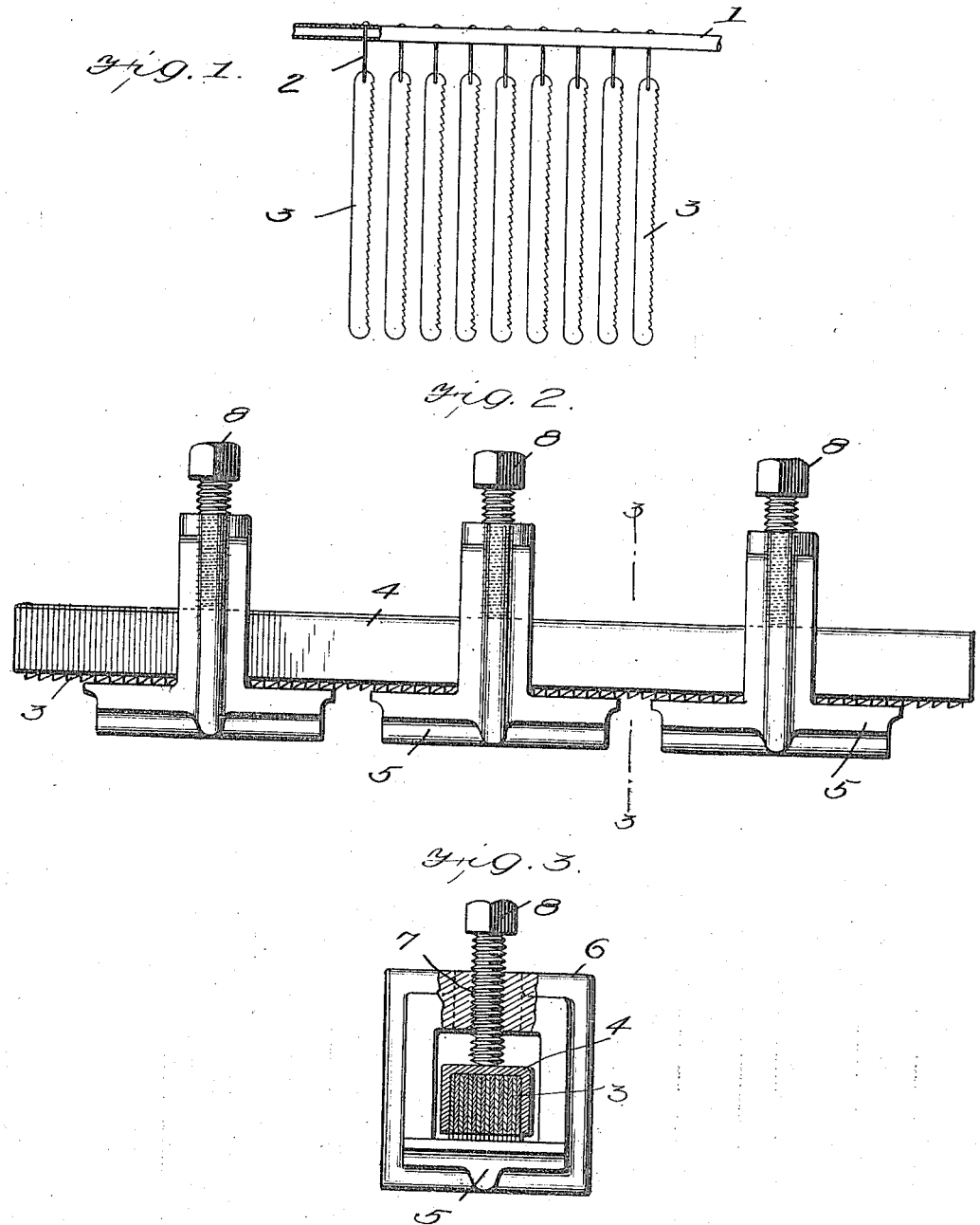

LAWRENCE LE ROY COOK, OF INDIANAPOLIS, INDIANA.

APPARATUS FOR TREATING SAWS.

1,233,193. Specification of Letters Patent. Patented July 10, 1917.

Application filed March 9, 1917. Serial No. 153,600.

*To all whom it may concern:*

Be it known that I, LAWRENCE L. COOK, a citizen of the United States, and a resident of Indianapolis, in the county of Marion and State of Indiana, have invented an Improvement in Apparatus for Treating Saws, of which the following is a specification.

My invention is an improvement in methods and apparatus for hardening, tempering and strengthening saws, and has for its object to provide a means and apparatus for supporting the saws during the hardening and tempering in such manner that they cannot kink or bend or get out of true.

In the drawings:

Figure 1 is a front view with parts in section showing the manner of supporting the saws during the heating and dipping in oil.

Fig. 2 is a front view of the clamp for holding the saws.

Fig. 3 is a section on the line 3—3 of Fig. 2.

During the hardening of the saws they are supported in the manner shown in Fig. 1. A pipe 1 is provided of suitable length, having a series of diametrical openings, which are engaged by hooks 2, and these hooks support the saws 3, the hooks being passed through the openings in the ends of the saws, and the saws are supported in approximately the same plane, depending from the hooks.

Supported in this manner, saws are placed in the top of the furnace and heated, and after heating they are dipped straight down into the hardening oil. The saws are withdrawn from the oil as soon as possible, in order to retain the highest possible heat, and after being dumped from the supporting rack 1—2, they are collected and placed in channel-shaped forms shown at 4 in Figs. 2 and 3.

These forms are of a width such that the saws will fit snugly therein when arranged one beside the other, and they are of a width to hold as many saws as may be desired. The saws should fit as tightly as possible, and the forms are then placed in the clamps shown in Figs. 2 and 3.

Each of these clamps consists of a base 5 having a plane upper surface, and each base has in connection therewith an open substantially rectangular frame 6. These frames extend upwardly from the center of the base and transversely thereof, and each frame has at the center of its upper cross member a threaded opening. A set screw 8 is threaded through the opening, and the clamps are arranged in the manner shown in Fig. 2, a sufficient number of clamps being provided to engage the saws throughout practically their entire length. The forms are placed in the clamps in reversed position, with the teeth of the saws resting on the upper faces of the bases 5 of the clamps, and the set screws are turned to make sufficient pressure on the saws. The saws are then placed in the oil to temper, being left from seventeen to twenty minutes, with the oil at a temperature of about 390°.

After tempering the saws are withdrawn from the clamps and forms and are packed tightly in boxes. They should stand for about twenty-four hours in order to thoroughly cool.

Under the usual methods there is much breakage of the saws in trying to straighten them after hardening. The saws come out with hollow bellies, hollow backs and long and short kinks in the sides. Makers attempt to eliminate the hollows by rolling, which cracks the hard saw. They attempt to eliminate the bows or kinks by bending with the fingers while hot, which causes more breaking.

With the improved process, the saws are more uniform, straighter, the breakage is eliminated, and the brittleness is eliminated from the steel, making the saws flexible. A saw treated in the manner above mentioned may have its ends bent to touch without breaking the saw. About one minute only is required to transfer a bunch of saws from the hardening oil to the tempering tank.

It will be understood that the form and the clamps are of rigid material, as for instance cast iron. The saws are arranged side by side in the form and by means of the plates the backs of the saws are pressed tightly into contact with the rigid bottom of the form. After tempering, the saws and clamps are dipped in cold water for cooling.

I claim:

1. An apparatus for holding saws during tempering, consisting of a channel-shaped form having side walls of less depth than the width of the saws to permit the teeth of the saws to project, and clamps each consisting of a plate and a loop extending upwardly from the center of the plate and engaging over the form, and a set screw threaded through each loop to engage the bottom of the form.

2. An apparatus for holding saws during tempering, consisting of a channel-shaped form having side walls of less depth than the width of the saws to permit the teeth of the saws to project, and means for engaging the teeth of the saws to press the backs into close contact with the form.

LAWRENCE LE ROY COOK.

Witnesses:
E. A. ANDREWS,
W. M. HARTSOOK.

Copies of this patent may be obtained for five cents each, by addressing the "Commissioner of Patents, Washington, D. C."